June 8, 1954

C. W. DALZELL 2,680,562

COUNTER MECHANISM

Filed Sept. 23, 1952

INVENTOR
Clarence W. Dalzell
BY
Robert F. Peck
ATTORNEY

INVENTOR
Clarence W. Dalzell.
BY Robert F. Peck
ATTORNEY

June 8, 1954
C. W. DALZELL
2,680,562
COUNTER MECHANISM
Filed Sept. 23, 1952
3 Sheets—Sheet 3
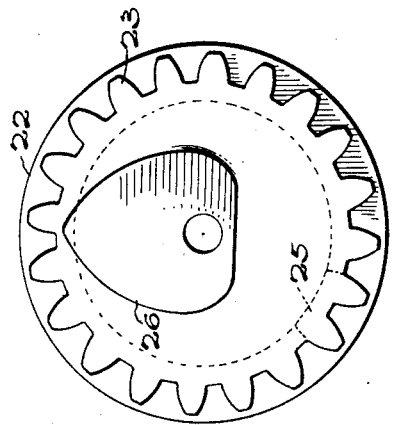
Fig. 6.
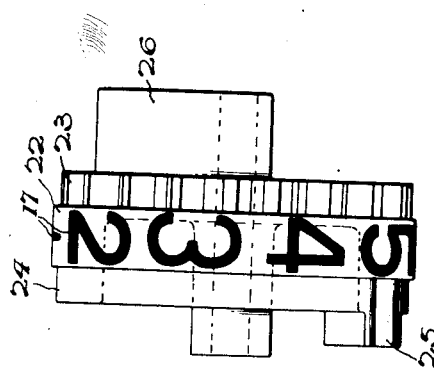
Fig. 5.
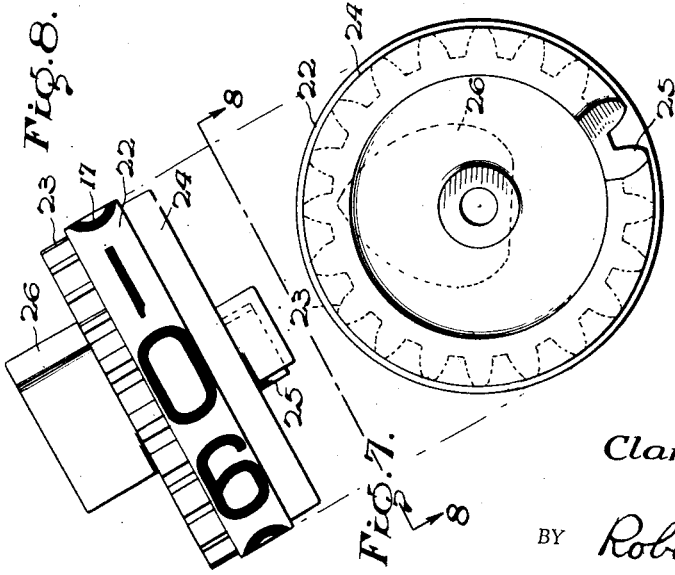
Fig. 8.
Fig. 7.
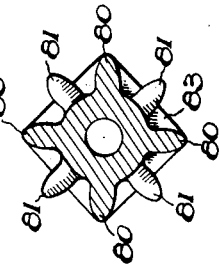
Fig. 10.
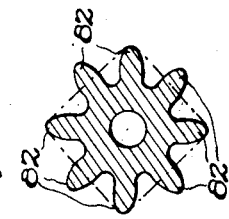
Fig. 9.
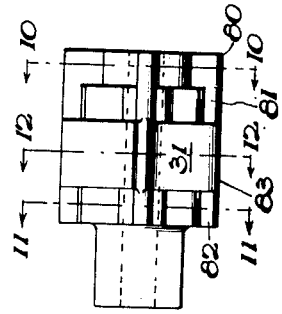
Fig. 11.
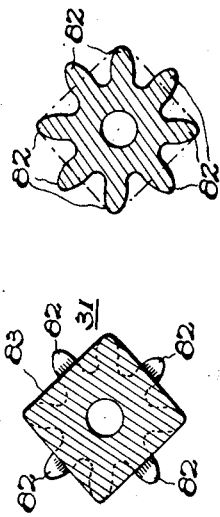
Fig. 12.
INVENTOR
Clarence W. Dalzell.
BY Robert F. Peck
ATTORNEY Patented June 8, 1954

2,680,562

UNITED STATES PATENT OFFICE 2,680,562

COUNTER MECHANISM

Clarence W. Dalzell, Towson, Md., assignor to Bendix Aviation Corporation, Baltimore, Md., a corporation of Delaware Application September 23, 1952, Serial No. 311,114

11 Claims. (Cl. 235—144)

1

This invention relates generally to a counter mechanism and more particularly to improvements in such a mechanism for adapting same for use in connection with a device for measuring air flow.

In the usual form of devices for measuring air flow, a member, such as a propeller, is positioned in the path of the air and the propeller is permitted to turn so that the number of revolutions of the propeller is proportional to the quantity of air flowing. If the device is used for a timed interval, the total number of revolutions in the time interval used is proportional to the average velocity of the air flow. Normally with such devices some mechanism must be used to count the number of revolutions of the propeller or at least count a proportionate number of the propeller revolutions. In addition to performing counting operations such a mechanism must have some means to disengage the counter upon cessation of the measuring cycle so that the total amount of wind flow as registered can be conveniently observed and recorded. Furthermore, such a mechanism must have a means of resetting the counting parts to a zero or start position so that the device can be used again. The problem is further complicated when the size of the air flow measuring device is considered, in that usually a small portable device is necessary thereby making the counting component necessarily small to fit into such a unit. The counter thus must be simple, accurate, compact and easily and positively reset to be of optimum value in an air flow measuring device. The counting mechanism embodied in the subject invention was designed primarily for use in connection with an air flow measuring device of the type shown in U. S. design patent number Des. 167,242 issued July 8, 1952, entitled "Air Speed Indicating Device," but it is not necessarily limited to such use.

The type of counting mechanism selected for the intended use is a so-called decade counter having a series of number wheels arranged side by side, each wheel bearing the digits 0 to 9. Suitable interconnecting transfer pinions are provided to permit the mechanism to register air flow in terms of four digits. One of the wheels is connected by suitable means to the driving force which responds to air flow and the remainder of the counting wheels are sequentially interconnected to the first wheel by means of the transfer pinions. It has been found that molded nylon is excellent as a material to be used for the wheels and pinions, the remainder of the parts being constructed of metal or other suitable material.

The improvements residing in the type of counter described above are in the novel means of resetting the counter to its zero or start position together with a novel brake arrangement to prevent drift of the number wheels upon disengagement from the driving force. Thus, with the driving means disengaged, the number wheels actually float on the shaft save for friction and in a portable instrument such a condition could cause the wheels to drift during handling. Therefore a positive brake has been embodied in the design to prevent this drift from occurring.

As to the resetting problem, when the counter has been read and its total recorded, the reset mechanism must accurately reposition the wheels for additional measuring cycles. It has been found that heart-shaped cams integrally mounted as part of the number wheels and co-acting with a series of movable fingers will provide a very simple and foolproof resetting mechanism. Each finger is individually adjustable to take care of manufacturing tolerances so that the overall costs of manufacture are kept to a minimum. Furthermore, the fingers provided for resetting the number wheels also embody means to lock the transfer pinions against rotation during the resetting operation, thus eliminating possible drift of the transfer pinions and preventing the mechanism from becoming jammed and therefore unusable. Simple adjustments are embodied in the overall design to further simplify the manufacturing problem and all of the improvements, so far described, contribute to a unit which can be manufactured at low cost, calibrated and adjusted in the factory, and sent out in the field for use with a very minimum of field maintenance and a maximum of utility and accuracy.

The advantages and benefits to be derived from the use of the subject invention will be readily understood upon reference to the detailed specification to follow and in conjunction with the drawings annexed hereto in which:

Figure 5 is a view in elevation of a decade number wheel, with the numbers shown thereon.

Figure 6 is an end view of the wheel shown in Figure 5, looking at it from the right-hand side.

Figure 7 is an end view of the wheel shown in Figure 5, looking at it from the left-hand side.

Figure 8 is a top view of the wheel shown in Figure 5, with the numbers in place, and looking at the wheel along the lines 8—8 in Figure 7.

Figure 9 is a view in elevation of the transfer pinion.

Figure 10 is a sectional-view taken along the lines 10—10 in Figure 9.

Figure 11 is a sectional view taken along the lines 11—11 in Figure 9.

Figure 12 is a sectional view taken along the lines 12—12 in Figure 9.

Figure 1:
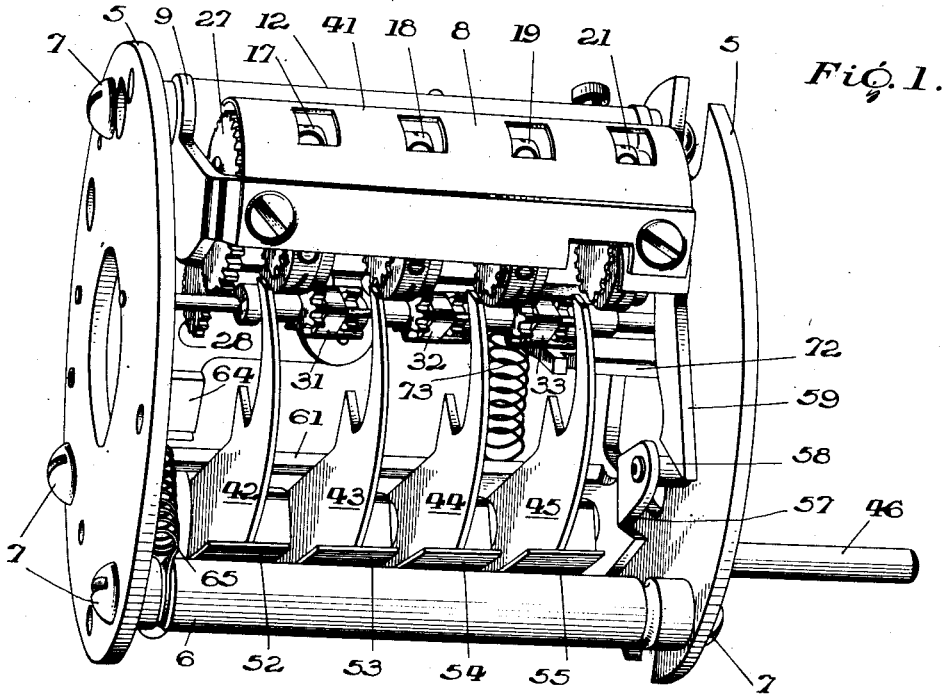
Figure 1 is a perspective view of the completely assembled novel counter mechanism.
Figure 2:
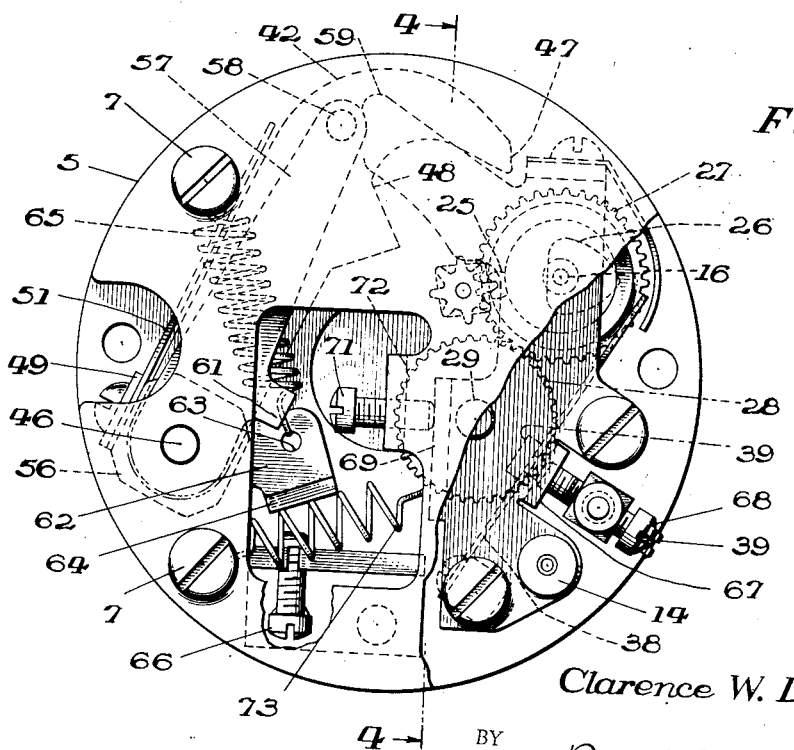
Figure 2 is an end view of the device shown in Figure 1 with a portion of the supporting plate cut away.
Figure 3:
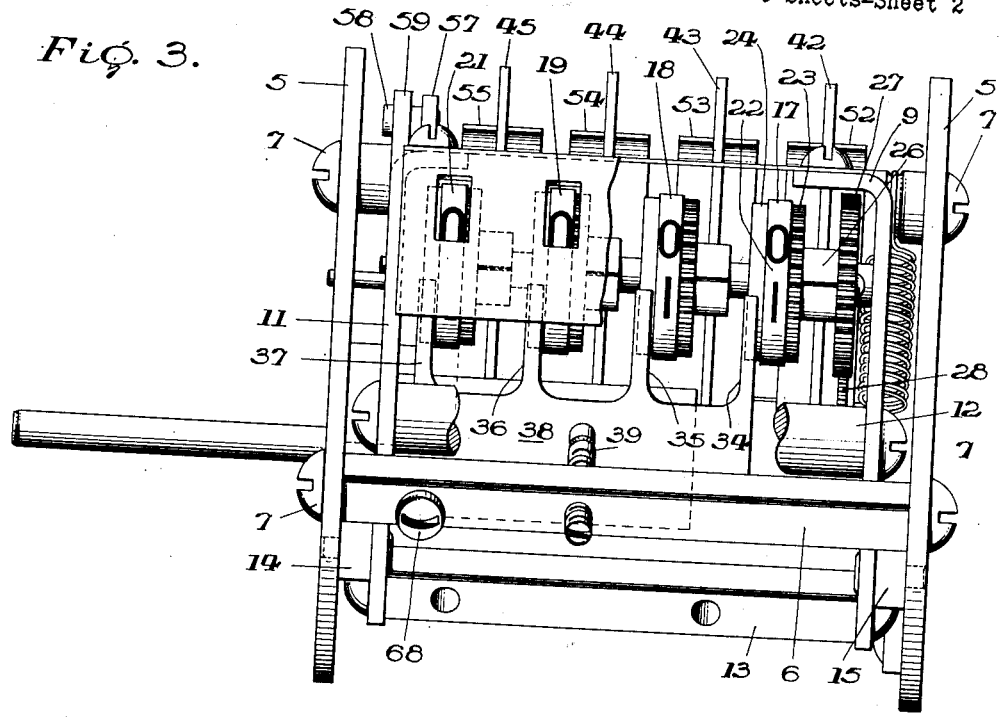
Figure 3 is a front view of the mechanism shown in Figure 1 with a portion of the cover plate cut away to show the number wheels.
Figure 4:
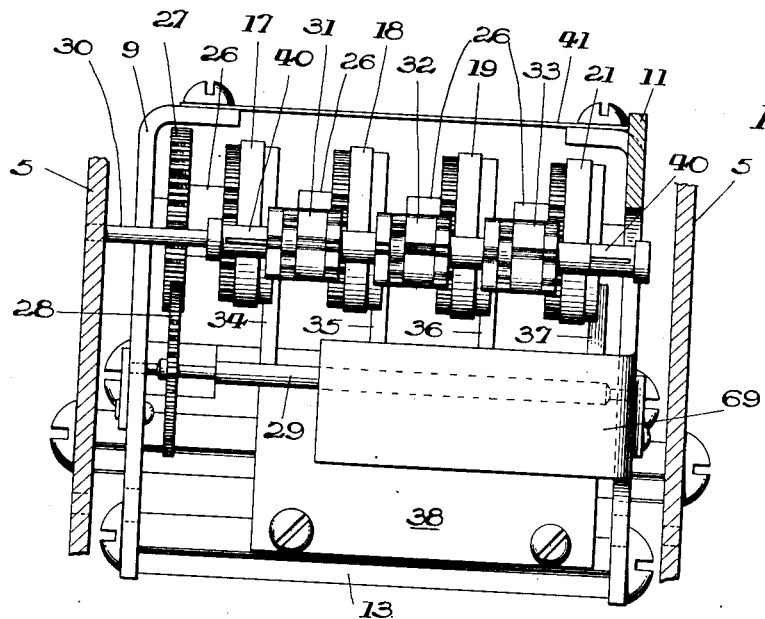
Figure 4 is a sectional view taken along the lines 4—4 in Figure 2.

Referring now to the drawings, we see that the counter mechanism comprises a pair of support plates 5 held together in spaced relationship by means of a plurality of spacers 6. Suitable screws 7 cooperate with the spacers 6 to achieve a rugged, compact unit. A cradle 8 is pivotally mounted on the support plates 5 and comprises a pair of side plates 9, 11 interconnected by means of spacers 12, 13. The side plates and the spacers are secured together by means of suitable screws or the like.

A pair of shaft bearings 14, 15 are provided at the lower extremities of plates 9, 11 to permit the cradle to have a pivotal motion with respect to support plates 5. These bearings have both of their ends reduced in diameter, one end passing through the support plates 5 and the other end passing through cradle plates 9, 11. The ends passing through the cradle plates are rolled over to thereby hold the cradle in place on the bearings. Suitably journaled for rotation in the cradle plates 9, 11 is a number wheel shaft 16 on which are rotatably mounted a series of number wheels 17, 18, 19 and 21.

Each number wheel is identical in configuration and the details of construction are clearly shown in Figures 5-8 inclusive. By way of example, and referring to the aforesaid figures, there is shown the number wheel 17 comprising a molded nylon member having the digits 0 to 9 (generally indicated at 22), appropriately placed around its outer periphery and substantially centered therein. The wheel is undercut surrounding the hub to reduce weight to a minimum and has one side thereof molded in the form of a spur gear 23. The other side of the wheel has one inverse gear tooth 25 molded therein, said tooth being substantially double the width of the teeth on spur gear 23. The tooth 25 opens into the smooth surface 24 surrounding this side of the wheel. Integrally molded as a part of each number wheel is the heart-shaped cam 26, situated contiguous to the spur gear 23.

Thus far, all of the number wheels are identical, but in the case of wheel 17 it is slightly modified, in that idler gear 27 is mounted integral therewith so that the wheel 17 can be connected to a driving mechanism. A second idler gear 28 is carried by a shaft 29 journalled in cradle 8, the two idler gears meshing and the latter one being adapted for connection to the main driving gear coming from the mechanism responsive to air flow.

A series of identical transfer pinions 31, 32 and 33 roughly in the form of a star, is mounted for rotation about the shaft 30 carried by plates 5. A pair of split collars 40 co-act with the opposite ends of the assembled pinions to hold them in the proper position along the shaft for engagement with the number wheels. The details of these pinions are shown clearly in Figures 9, 10, 11 and 12 and, by way of example, the one shown may be considered as pinion 31 and for the particular application mentioned herein, the pinions are formed from molded nylon members. On one end of the pinion, there is provided a series of four gear teeth 80, spaced 90 degrees apart. Immediately adjacent the teeth 80, and at the other end of the pinion, there is provided a series of eight gear teeth, 81 and 82, respectively, spaced 45 degrees apart, four of which are aligned with the teeth 80. Separating the teeth 81 and 82, is the diamond section 83.

Considering the inter-action of the number wheels with their association transfer pinions, with the number wheel 17 in the start position, rotation of same will not move the pinions until inverse tooth 25 engages the aligned teeth of the series 80 and 81. Before and after such engagement, the surface 24 merely rides between adjacent teeth of the series 80, but when engaged, the pinion makes a quarter turn. Movement of the pinion causes the next number wheel to move one digit by virtue of the pinion teeth 82 engaging the spur gear formed therein. Continued rotation of wheel 17 will repeat the aforesaid cycle, thus turning the wheels 18, 19 and 21 successively as air flow in terms of up to four digit quantities is measured. The above-described counting action is conventional, and well known in the art, and forms no part of the subject invention, but has been briefly described for the sake of clarity.

If the mechanism is used in connection with an air flow meter measuring a rapid flow of air, the wheels will rotate rapidly as the mechanism responds to wind flow. Now if the main driving means, which is not shown in the drawings and does not form a part of the subject invention, is disconnected from the idler gear 28, the reading of the number wheels will give the total air flow for the time interval under measurement. However, because of the sensitive nature of the device, disengagement of the driving means might permit the number wheels to drift thereby reducing the accuracy of the counter. To overcome this defect, a series of leaf springs 34, 35, 36, 37 engage the smooth peripheries of the number wheels at all times when the counting mechanism is disengaged from the main driving means. These individual leaf springs are formed from a single sheet of spring material 38 which is anchored to the spacer 13 and suitably slotted to co-act with the screw 39 adjustably mounted in one of the main spacers interconnecting the support plates 5. By moving the screw 39 in and out with respect to its associated spacer member, the spring tension on the braking member 38 can be adjusted to suit the particular assembly. It is to be understood that the spring tension is slight thereby adding no appreciable friction to the system but yet it is sufficiently strong to prevent motion of the number wheels when they are literally floating on the shaft 16 and not under the influence of any positive driving force supplied by either the driving means or otherwise.

A cover plate in the form of an arcuate member 41 may be mounted on the upper extremities of the cradle plates 9 and 11 and can be provided with a series of slots cooperating with the number wheels to frame a single line of digits for ease of observation.

Turning now to the reset portion of the assembly, there is shown a series of reset fingers 42, 43, 44 and 45. Each of these fingers is identical and is in the form of a sheet metal blade carried by the reset shaft 46 and freely rotatable thereon. By way of illustration and referring to blade 42, the active portions of the blade are the tip 47 and the jaw 48. Each blade is affixed to a hub carried by shaft 46 and the hubs provide a series of spacers between the reset fingers and the entire assembly is clamped between a pair of collars surrounding the reset shaft and secured thereto by means of set screws or the like. Straddling the two collars and rigidly mounted thereon is a strap 49 which serves the purpose of clamping in place the leaf spring 51 having a plurality of tongues 52, 53, 54, 55 cooperating with the fingers 42, 43, 44, 45 respectively. From the arrangement described so far, rotation of the reset shaft 46 will cause the individual tongues to move against its associated finger and thereby carry the fingers toward the number wheels to perform the resetting operation. Also affixed to the collar 56 (which is one of the collars carrying the strap 49), there is an arm 57 offset at its outer extremity and carrying thereon a small stud 58. This stud cooperates with projection 59 extending outwardly from cradle frame 11 and this arrangement permits the arm 57 to move the cradle 8 for purposes of resetting the number wheels. Extending transversely across the inner surfaces of the reset fingers and at the bottom thereof is a strap 61 formed integrally with the arm 57 for the purpose of confining the fingers in their proper position.

The collar surrounding the shaft 46 at its inner extremity has formed integrally therewith projection 62 which has an aperture 63 and an inturned ear 64. The aperture 63 has affixed thereto one end of a spring 65, the other end of which is affixed to one of the spacer members 6. This spring holds the reset mechanism in its normal unused position during normal operation of the counting mechanism. The inturned ear 64 cooperates with a screw 66 carried by the plate 5 and this arrangement constitutes an adjustable stop limiting forward motion of the resetting mechanism. This stop prevents overturning of the reset shaft, thus eliminating the possibility of excess torques being applied.

In operation, upon rotation of the reset shaft 46, the stud 58 carried by arm 57 co-acts with the projection 59 on the cradle 8 to move the cradle, which has the effect of first disengaging the number wheels from the transfer pinions and then disengaging the idler gear 28 from its associated driving mechanism. In the position the number wheels are locked against motion by means of the brake 38.

As the reset shaft is further turned, the stud 58 gets underneath the projection 59 and further turns the cradle 8 and by this time the tips 47 of the reset fingers have contacted the heartshaped cams and repositioned the number wheels to the zero position. Coincident with this action the jaws 48 forming a part of the reset fingers contact one of the surfaces of the diamond section 33 of the transfer pinions and locks them against rotation thereby preventing any jamming of the mechanism upon return to normal position.

It is to be noted that the movement of the cradle is limited in both directions by adjustable stops, one of which is formed by means of the inturned ear 67 on plate 11 in cooperation with the screw 68 carried by one of the spacer members 6. This adjustment limits motion in a forward direction of the cradle and the stop in the opposite direction is provided by means of the inturned flange 69 of plate 11 in cooperation with screw 71 carried by an inturned portion 72 of main plate 5. The inturned flange 69 also carries one end of spring 73, the other end of which is affixed to one of the main spacer members 6, the spring serving to bias the cradle in its normal counting position.

The stop limiting forward motion of the cradle is adjustable to permit minimum disengagement of the number wheels and transfer pinions and must also co-act with brake adjusting screw 39 to permit engagement of the brake upon disengagement of the number wheels from the transfer pinions and driving means. These two stops work together to simplify the problem of manufacturing tolerances and to permit accurate calibration compatible with minimum manufacturing costs.

The back-stop for the cradle is adjustable to permit proper engagement of the number wheels and associated transfer pinions, and also provides for proper meshing of the idler gear with its associated main drive member.

From the above, it is evident that the counter mechanism embodied in the subject invention is the essence of simplicity, providing many design features calculated to improve the utility and accuracy of such devices. Such features also being compatible with minimum manufacturing costs and quantity manufacturing techniques. Although the mechanism is ideally adapted for use in connection with a portable air flow measuring device, it is obvious that it is quite well suited for other applications wherein similar conditions of operation exist.

What is claimed and desired to be secured by United States Letters Patent is:

1. A counter mechanism comprising, in combination: a pair of main support plates, a cradle pivotally mounted between said plates for limited rocking motion, a first shaft carried by said cradle, a plurality of decade number wheels individually mounted for rotation about said first shaft, each of said number wheels having a reset cam connected thereto for rotation therewith, a second shaft carried by said plates, a plurality of transfer pinions individually mounted for rotation about said second shaft, said pinions serving to interconnect said number wheels, means for driving one of said number wheels, and reset means for said number wheels, said reset means comprising a reset shaft carried by said plates, an arm rotatably mounted on said reset shaft for cooperating with said cradle to disengage said driving means and to disengage said transfer pinions from said number wheels, a plurality of fingers rotatably mounted on said reset shaft for cooperating with said reset cams to restore said number wheels to a starting position, said fingers and said arm being adapted to move together upon rotation of said reset shaft.

2. The combination defined by claim 1 wherein said fingers also cooperate with said transfer pinions to prevent movement of same during the resetting cycle.

3. The combination defined by claim 1 wherein each of said number wheels is provided with braking means to prevent movement of said wheels upon disengagement from said driving means.

4. The combination defined by claim 3 wherein the braking pressure exerted by said braking means can be adjusted simultaneously for all number wheels.

5. The combination defined by claim 4 wherein adjustable stops are provided to limit both the forward and backward movement of said cradle member.

6. The combination defined by claim 5 wherein said cradle member is normally biased to hold said number wheels in engagement with said transfer pinions and said driving means.

7. The combination defined by claim 1 wherein each of said fingers floats on said reset shaft and is actuated by individual resilient members, said resilient members being rigidly mounted with respect to said arm and moving integrally therewith.

8. The combination defined by claim 7 wherein said reset shaft has one end thereof extending outwardly from its associated main plate, said extension being adapted for manual rotation of said reset shaft.

9. The combination defined by claim 8 wherein said reset shaft is normally biased to hold said fingers and said arm in disengagement with said cradle member and adjustable means are provided to limit motion of said reset means in a direction toward said cradle member.

10. The combination defined by claim 1 wherein said cams have a substantially heart-shaped configuration.

11. The combination defined by claim 1 wherein means are provided to prevent motion of said transfer pinions during the resetting cycle, said means operating automatically upon operation of said reset means.

References Cited in the file of this patent

UNITED STATES PATENTS

| Number | Name | Date |
|---|---|---|
| 1,597,053 | Cherry | Aug. 24, 1926 |

FOREIGN PATENTS

| Number | Country | Date |
|---|---|---|
| 610,472 | Great Britain | Oct. 15, 1948 |